United States Patent [19]
Curtis et al.

[11] Patent Number: 5,123,581
[45] Date of Patent: Jun. 23, 1992

[54] OBLIQUE FRACTURING OF OPTICAL FIBERS BY OFFSET SHEARING

[75] Inventors: Lyn Curtis, Fair Haven; Derek D. Mahoney, Tinton Falls; Virendra S. Shah, Edison; William C. Young, Middletown, all of N.J.

[73] Assignee: Bell Communications Research, Inc., Livingston, N.J.

[21] Appl. No.: 638,736

[22] Filed: Jan. 4, 1991

[51] Int. Cl.$^5$ ............................................ C03B 37/16
[52] U.S. Cl. .................................. 225/2; 225/96.5; 225/104
[58] Field of Search .............. 225/106, 104, 96, 96.5, 225/2

[56] References Cited

U.S. PATENT DOCUMENTS

| | | | |
|---|---|---|---|
| 4,203,539 | 5/1980 | Miller | 225/2 |
| 4,607,775 | 8/1986 | Krause | 225/96.5 |
| 4,976,390 | 12/1990 | Gee et al. | 225/96 |
| 5,024,363 | 6/1991 | Suda et al. | 225/96.5 |

FOREIGN PATENT DOCUMENTS

| | | | |
|---|---|---|---|
| 2-004203 | 1/1990 | Japan | 225/96 |
| 8302269 | 7/1983 | PCT Int'l Appl. | 225/96.5 |
| 2177391 | 1/1987 | United Kingdom | 225/2 |

Primary Examiner—Frank T. Yost
Assistant Examiner—John M. Husar
Attorney, Agent, or Firm—Leonard Charles Suchyta; Lionel N. White

[57] ABSTRACT

A smooth, oblique-angled endface fracture of an optical fiber 20 useful in low reflectance, low insertion loss mechanical splices is achieved by tensioning the fiber while it is in contact with the abrupt edge 23 of an anvil 22 and applying a shearing force to the fiber at a point closely offset from the anvil edge and in a direction substantially perpendicular to the longitudinal axis of the fiber.

9 Claims, 2 Drawing Sheets

OBLIQUE FRACTURING OF OPTICAL FIBERS BY OFFSET SHEARING

BACKGROUND OF THE INVENTION

The present invention relates to the preparation of optical fibers to be joined in end-to-end, butt-coupled splices or used in other mechanical connections. In particular, the invention provides a method and apparatus for quickly and effectively obtaining oblique angle endface fractures of standard commercial optical fibers. Such endfaces are desirable for the assembly of low reflection, low insertion loss mechanical splices and connections, and the use of a fracturing method to form them avoids the tedious practice of shaping the fiber ends by means of grinding and polishing, a practice which unfortunately has additional undesirable effects upon the fiber.

The efficiency of optical fiber splices relies in great measure upon the proper preparation of the fiber ends prior to the joining of the fibers. Fusion coupling and physical contact between butt-coupled fibers have been moderately successful means for acquiring effective light transmission between fibers. These practices usually require highly precise, perpendicular endfaces, however, and much effort is expended in polishing severed fiber ends to tolerances of less than one degree from perpendicularity. An improvement in the preparation process was realized in the perpendicular fracturing of the fiber as described by Gloge et al. in U.S. Pat. No. 4,027,814. Utilizing the natural tendency of fibers to fracture in a perpendicular plane, Gloge et al. developed their method of controlling bending stress to ensure that such a fractured endface was devoid of light-scattering sites. Other tools, such as the Model CT-07 marketed by Alcoa Fujikura Ltd., Spartansburg, S.C., have been devised to obtain perpendicular endface fractures in optical fibers.

A number of studies, for example, Young et al., "Optimization of Return Loss and Insertion Loss Performance of Single-Mode Fiber Mechanical Splices", IWCS Conference, Reno, Nev. (1988), have indicated that improved return loss can be obtained in mechanical optical fiber splices through the use of fiber endfaces that deviate from the perpendicular by an angle in the range of about nine degrees. To implement this improvement the common practice of grinding and polishing the fiber endface was employed in forming the desired oblique angle. It was observed, however, that the polishing process causes a compaction of fiber material in the vicinity of the endface with a resulting localized variation in refractive index that introduces reflective sites adversely affecting splice return loss.

We have now discovered a method of obliquely fracturing optical fibers, typically having the standard 125 micrometer cladding diameter, in order to take advantage of the desirable effect of the resulting fiber endfaces on mechanical splice return loss while enjoying the additional physical and economical benefits of a fracturing process.

SUMMARY OF THE INVENTION

The present invention relies upon our discovery that although a brittle rod material such as a glass optical fiber has the tendency under tensile stress to fracture along the plane of least resistance, namely perpendicular to the fiber axis, this tendency can be significantly compensated by scoring the surface of a stressed fiber in a direction substantially perpendicular to the fiber axis, but at a point longitudinally offset from the abrupt edge of a backing anvil. In this manner we have been able to consistently obtain an oblique fracture endface that is in the angular range most useful in high return loss, butt-coupled mechanical fiber splices and joints.

Utilizing a device that is a significant improvement on the aforementioned Fujikura tool, an optical fiber is subjected to longitudinal tension in the range of about 65 to 100 grams while in firm contact with the surface of an anvil element that presents an abrupt edge disposed transverse to the fiber axis. A sharp scoring blade of diamond or metal alloy significantly harder than a glass fiber is then gradually forced into the surface of the fiber opposite the contacting anvil at a point longitudinally offset from the anvil edge by a distance of about 20 to 60 micrometers. The noted tendency for the tensile stress to be relieved most efficiently along the perpendicular plane apparently is affected by an additional compressive stress that is generated between the advancing and the abrupt edge of the anvil. It appears that as a result of these combined stresses in the fiber, the fracture takes place along an oblique plane that runs, on average, at about 6 to 12 degrees from perpendicular to the fiber axis. In experimental tests fibers with this range of endface fracture angles exhibited return losses greater than 70 dB, as compared with perpendicularly endfaced fibers.

A device suitable for reliably obtaining these optimally angled oblique fiber endfaces has been constructed. In a preferred embodiment, the device includes means for applying a substantially constant longitudinal tension to a fiber while in contact with a lateral anvil and means for guiding an inclined blade along the anvil and into contact with the tensioned fiber at the prescribed distance from the anvil edge. The inclined attitude of the scoring blade provides the gradual depressing of the advancing blade into the fiber surface with resulting increase in the depth of the score and the compressive stress until the oblique fracture occurs. This slicing action of the scoring blade is particularly useful in penetrating the protective coating normally enveloping the commercial fiber and thus allows the device to be employed in obtaining oblique endfaces with coated as well as stripped fibers. It also enables a group of fibers to be effectively fractured at a consistent oblique angle in a single operation.

THE DRAWING

The present invention will be described with reference to the accompanying drawing of which:

DESCRIPTION OF THE INVENTION

Figure 1:
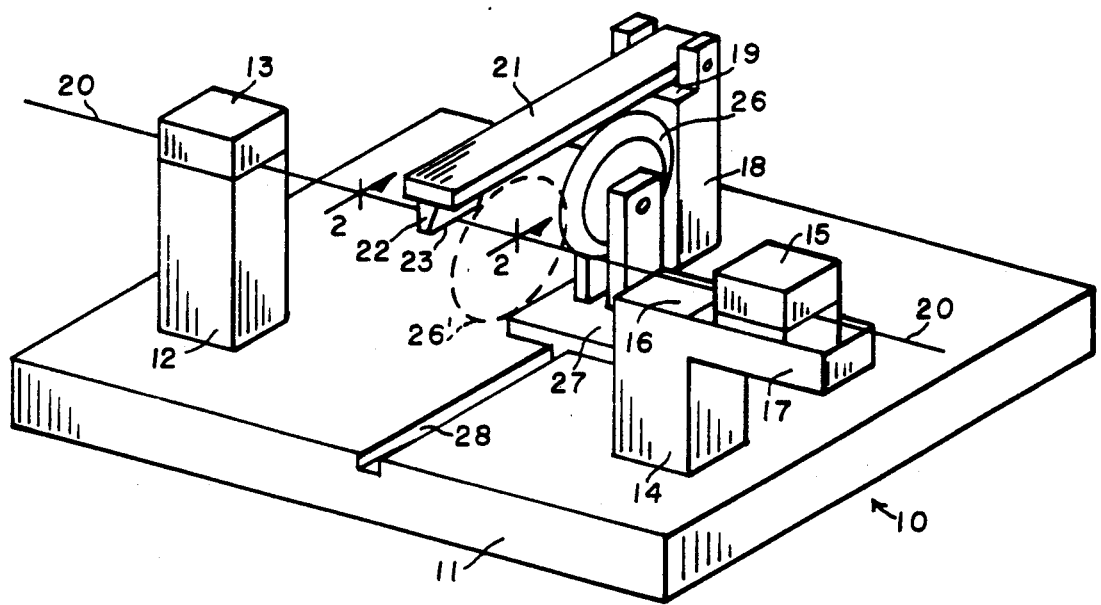
FIG. 1 is an oblique view of a simplified device embodying the invention.

As depicted in FIG. 1, a device 10 embodying the present invention comprises a base 11 on which are mounted pedestals 12, 14 supporting means 13, 15 for clamping a fiber 20. Extending horizontally from pedestal 14 is channel arm 17 in which clamping means 15 is arranged for reciprocal movement in the direction of clamping means 13. Compression spring means, not shown, located in the forward section 16 of channel arm 17 bears upon clamping means 15 and provides a constant tension upon a fiber 20 clamped in means 13, 15.

Also mounted on base 11 is pedestal 18 at the upper end of which extending arm 21 is pivotally attached to swing in a plane perpendicular to a fiber 20 mounted between clamping means 13, 15. At the free end of arm 21 is an anvil element 22 which presents an abrupt edge 23 disposed laterally of fiber 20. The downward swing of arm 21 is limited by its contact with shoulder 19 of pedestal 18 at a position in which anvil 22 has depressed fiber 20 a short distance below the plane of the fiber's free extension between clamping means 13, 15, thereby ensuring that edge 23 is in firm contact with the fiber.

A blade 26 is mounted on carriage 27 arranged in guide means 28 for reciprocal movement of the cutting edge of the blade in a plane perpendicular to fiber 20. The location of blade 26 laterally with respect to the movement of carriage 27 is adjusted such that the cutting edge plane is parallel to and offset slightly from anvil 23. In operation of device 10, anvil 22 is moved into contact with a tensioned fiber 20 and carriage 27 is moved toward the fiber so that the inclined edge of blade 26 increasingly bears upon the underside of fiber 20, thereby scoring the fiber and initiating the oblique fracture.

Figure 2:
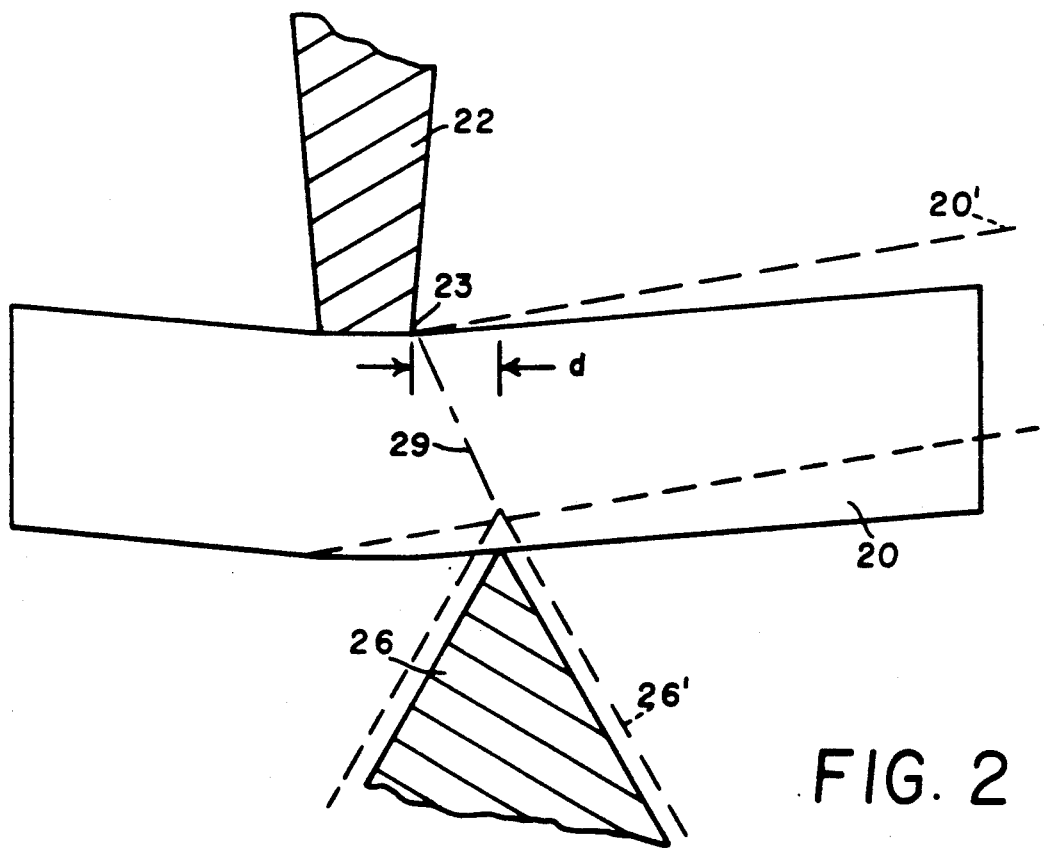
FIG. 2 is a front elevation view of the device of FIG. 1 taken in partial section along 2—2, depicting the relative association of the active device elements.
Figure 3:
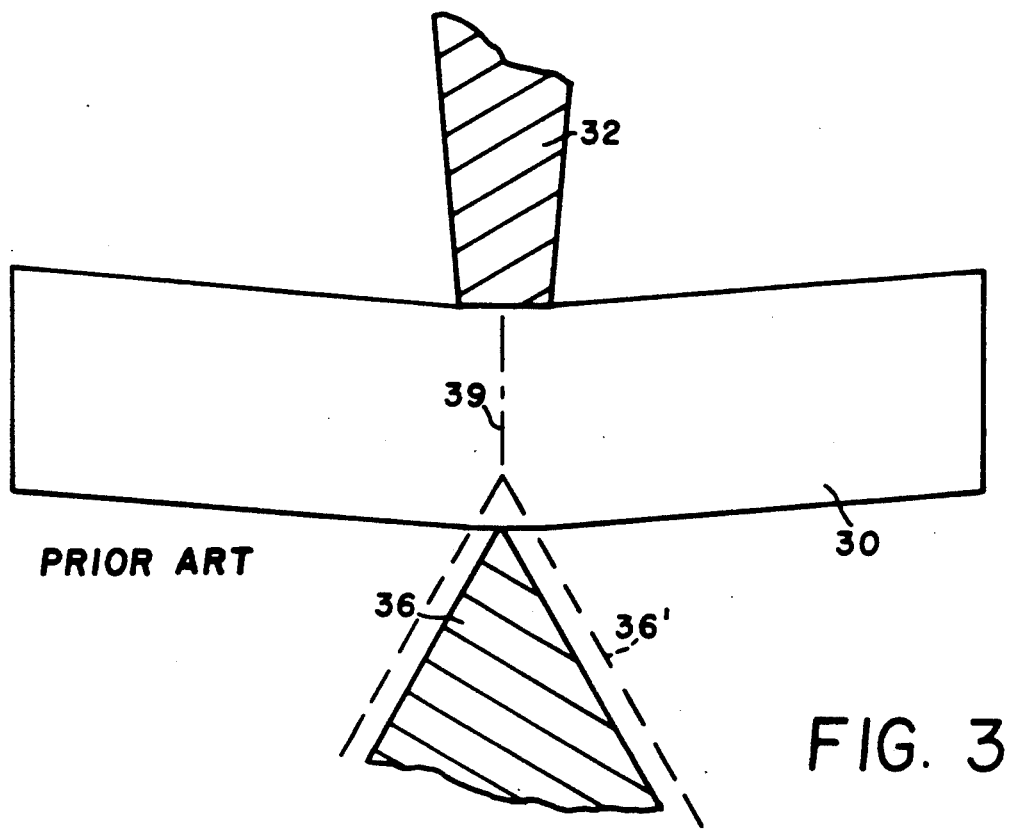
FIG. 3 is a view similar to that of FIG. 2, depicting the prior art.

The above-noted Fujikura tool is generally similar to device 10 in that it employs means for supporting an extended fiber, a backing anvil, and a sliding blade; however, the supporting means and the positional relationship between the latter elements are significantly different in the embodiment of the present invention. The Fujikura tool, for example, provides a pair of fixed clamping supports, such as members 12, 13, between which the fiber 20 is held. In mounting a fiber in that tool, an operator clamps the fiber in the first support, draws the fiber by hand across the second pedestal, applying some uncontrolled and varying amount of tension, and engages the second clamping means. The additional distinction may be seen in FIGS. 2 and 3 and resides in the fact that the central plane of the prior art anvil 32 is coincident with the plane of the cutting edge of blade 36. In device 10 embodying the present invention, on the other hand, the plane of blade 26 is offset from the abrupt edge 23 of anvil 22 by a prescribed distance, d.

In the operation of the present device to obtain a desired oblique angle fiber endface, a fiber 20 is clamped at stationary pedestal 12 by means 13 which may be one of many available screw or latch type devices. Movable clamping means 15 is positioned toward means 13 at the forward end of the channel in arm 17, thereby compressing the spring located in section 16. With the spring thus compressed, fiber 20 is clamped by means 15 which is thereafter released, allowing the spring to apply to the extended fiber a constant, predetermined tension of about 65 to 100 grams, depending on the strength of the selected spring. During the mounting of the fiber, arm 21 is raised sufficiently, either by hand or by spring means (not shown), to maintain anvil 22 out of contact with the fiber. After the fiber 20 is clamped in position, arm 21 is depressed until it contacts shoulder 19 of pedestal 18, thus causing anvil 22 to displace fiber 20 slightly, about 20 to 30 micrometers, to ensure good contact with the fiber at edge 23.

Blade carriage 27 is now slid along guide 28, thus moving blade 26 into contact with the underside of fiber 20 at a point that is offset a distance, d, of about 20 to 60 micrometers from the abrupt edge 23 of anvil 22. Continued movement of blade 26 to a position 26' causes the inclined cutting edge of the blade to start a score into fiber 20 and at the same time displace the fiber to a position 20', apparently causing a compressive stress along an oblique plane 29 in the fiber. With further movement of blade 26 and deepening of the score, the fiber fractures in a smooth, oblique endface of the desired angle in the range of about 6 to 12 degrees in the general direction of plane 29. In contrast to this operation, the original Fujikura tool blade 36 scores a fiber 30 (FIG. 3) at a point directly in line with anvil 32, thereby causing the typical perpendicular endface fracture along the transverse plane 39.

In a series of tests with a device embodying the present invention, the offset, d, was set at about 30, 40, and 50 micrometers from anvil edge 23 with resulting endface fracture angles in a bare fiber under about 85 grams tension averaging about 7, 10, and 12 degrees, respectively, as measured with a microscope and precision azimuth table, as well as by a transmitted light beam displacement method. Under similar tension, other tested fibers averaged 9.8 and 10.5 degree endface angles with a 27 to 43 micrometer range of offsets that averaged about 38 micrometers. Another series of tests was conducted with the device in which the tension on the fiber registered 85 grams and the offset was adjusted to about 50 micrometers. The 50 endface angles of 25 fractures ranged from 5.7 to 13.6 degrees with a mean of 9.1 and a standard deviation of 2.0 degrees. Measured with an optical time domain reflectometer, substantially all of the endfaces exhibited reflectances of less than $-70$ dB compared with perpendicular endfaces. Pairs of these fiber ends were assembled in randomly-oriented, index-matched, butt-coupled, mechanical splices which showed a mean splice loss of only 0.11 dB with a standard deviation of 0.05 dB.

Numerous variations in the depicted device may be made, provided the basic structural relationship of the offset between anvil and blade is maintained. The blade itself may, for example, have a straight edge inclined at about 5 to 10 degrees from the horizontal with the same effect as that of the 22 millimeter diameter blade employed in the described embodiment. The circular metallic alloy blade set with its uppermost arc at about 125 micrometers above the bottom surface of the fiber is preferred, however, since it may be partially rotated a number of times to present fresh cutting edges before a blade change is required. Another embodiment may be one in which the abrupt-edged anvil is provided by a transverse blade. Also, an adjusting screw might be added to obtain variations in the fiber-tensioning spring means, or a similar mechanism might be included in the blade mounting means to more readily obtain an optimum offset. Other embodiments of the present invention will also undoubtedly become apparent to the skilled artisan in the light of the foregoing description, and such embodiments are likewise intended to be encompassed within the scope of the invention as recited in the following claims.

What is claimed is:

1. A method of fracturing a standard optical fiber to obtain an endface plane having an oblique angle from a plane perpendicular to the fiber axis, which method comprises the steps of:

(a) creating sufficient constant longitudinal tension stress in said fiber to cause said fiber to fracture at a score in the surface thereof;

(b) contacting the surface of said fiber with the abrupt transverse edge of a backing anvil; and
(c) scoring the surface of said fiber opposite said anvil by forcing a blade transversely into said opposite fiber surface at a point closely offset from said anvil and said anvil edge.

2. A method according to claim 1 wherein said offset is in the range of about 20 to 60 micrometers.

3. A method according to claim 1 wherein said tension is maintained in the range of about 65 to 100 grams.

4. A method according to claim 3 for obtaining an endface angle of about 6 to 12 degrees wherein said fiber has a standard 125 micrometer diameter, said tension is maintained at about 85 grams, and said offset is in the range of about 30 to 50 micrometers.

5. A device for fracturing a standard optical fiber to obtain an endface plane having an oblique angel from a plane perpendicular to the axis of said fiber comprising a base, means upstanding from said base for suspending said fiber above and substantially parallel to said base and under sufficient constant longitudinal tension stress to cause said fiber to fracture at a score in the surface thereof, an anvil arranged to bear upon the surface of said fiber, and a blade arranged to move parallel to said base and into transverse contact with the surface of said fiber opposite said anvil, thereby scoring said fiber and initiating a fracture therein
characterized in that
(a) said anvil comprises an abrupt transverse edge arranged to contact said fiber surface when said anvil bears thereon; and
(b) said blade is arranged to contact said fiber at a point closely offset from said anvil and said anvil edge.

6. A device according to claim 5
characterized in that said anvil is a blade.

7. A device according to claim 5
characterized in that said offset is in the range of about 20 to 60 micrometers.

8. A device according to claim 5
characterized in that said fiber stressing means comprises means for maintaining said tension in the range of about 65 to 100 grams.

9. A device according to claim 8
characterized in that said fiber has a standard 125 micrometer diameter, said offset is in the range of about 30 to 50 micrometers, and said constant tension is about 85 grams, thereby causing an endface angle fracture in the range of about 6 to 12 degrees.

* * * * *